United States Patent [19]
Shin

[11] Patent Number: 5,455,680
[45] Date of Patent: Oct. 3, 1995

[54] APPARATUS FOR COMPRESSING AND DECOMPRESSING IMAGE DATA

[75] Inventor: Jae-Sub Shin, Seoul, Rep. of Korea

[73] Assignee: Samsung Electronics Co., Ltd., Kyounggi-do, Rep. of Korea

[21] Appl. No.: 153,044

[22] Filed: Nov. 17, 1993

[30] Foreign Application Priority Data

Jan. 30, 1993 [KR] Rep. of Korea .................. 93-1214

[51] Int. Cl.$^6$ .............................. H04N 1/41; H04N 1/415
[52] U.S. Cl. ...................... 358/426; 358/429; 358/433
[58] Field of Search ................................. 358/426, 430, 358/433, 133, 432, 429, 261.2, 135, 136, 397, 420; 382/56

[56] References Cited

U.S. PATENT DOCUMENTS 4,937,681   6/1990   Fujinawa et al. .................. 358/426

Primary Examiner—Edward L. Coles, Sr.
Assistant Examiner—Scott A. Rogers
Attorney, Agent, or Firm—Antonelli, Terry, Stout & Kraus

[57] ABSTRACT

The present invention relates to an apparatus for compressing and decompressing the digital image data designed for minimizing degradation of the image quality and for improving the compression efficiency. Discriminative over the conventional package quantization method based on the statistical characteristics of an image, the invention is configured such that the image is firstly segmented into predetermined number of sub-blocks by the block segmentator, and each divided blocks are adopted by the different compression technique in accordance with the shape or complicity of the image.

5 Claims, 5 Drawing Sheets

APPARATUS FOR COMPRESSING AND DECOMPRESSING IMAGE DATA

FIELD OF THE INVENTION

The present invention relates generally to an image data processing system and, more particularly, to an apparatus for compressing and decompressing the digital image data that has capability of minimizing degradation of the image quality.

DESCRIPTION OF THE PRIOR ART

In compressing the digital image data, the methods which utilize the statistical characteristics of the image have been commonly used, and the typical methods are Discrete Cosine Transform (DCT) or Discrete Sine Transform (DST) which transforms the image data from spatial domain to frequency domain and then removes the redundancy of the data at the frequency domain. These types of data compaction are currently adopted in the art, for they have a feature that the critical components of the image are capable of being concentrated on.

The scheme of the conventional image data compressing and decompressing technique can be embodied by the following exemplary description with reference to the attached drawing FIG. 1. There, the construction of the conventional image data compression and decompression arrangement is shown as a block diagram.

Compressing process is carried out by a compressor 3 such that the compressor reads out the image data stored in a first block memory 2, and it transforms the loaded image data from the spatial domain to the frequency domain by means of the above DCT technique. Here, the source image data is provided by a first video memory 1 and is to be stored in the block memory 2 in blocks of 8×8. The compressor 3 then performs a package compression according to the statistical characteristics of the image. It is well known in the art that the data compression is accomplished by the quantization method.

Such a compressed image data will be transmitted by a transmitter 4 coupled to the compressor 3 to a receiver 5 via transmission channel. The receiver 5 provides with the compressed image data to a decompressor 6.

Decompressing is carried out in the decompressor 6 such that the compressed image data is to be restored to the original image data in blocks of 8×8, and the decompressed data is provided to a second block memory 7.

In the course of compressing the image data as mentioned above, if the quantization is performed with low compression rate, it will have no data distortion due to the compression after the transformation of the image data from spatial domain to frequency domain by using the DCT method. However, if the level of quantization is increased in order to enhance the compression rate, the distortion of image will be appeared at the boundary or contour of an image, and particularly in the case of the color image, the blurring of color will appear in the display.

Further, since the package quantization has been held to one image frame, it requires the quantization be held one by one even with respect to the area which has substantially low variation of image segments or components, i.e., "flat area." Accordingly, this will accompany an unnecessary conduct in the compressing process and lowers the compression efficiency.

SUMMARY OF THE INVENTION

The object of the present invention is to overcome these and other problems and to provide an apparatus for compressing and decompressing digital image data, which is able to minimize the degradation of the image quality and to improve the compression efficiency.

With this object in view, the invention resides in an image data processing system which includes a video memory for storing the one frame image data and an apparatus for compressing and decompressing the image data for sending and receiving the compressed data through a transmitter and a receiver via a channel, the means for compressing and decompressing the image data comprises a first block memory for storing the image data from the video memory per predetermined block unit; a block segmentator for dividing said image data provided by said first block memory into prescribed number of sub-blocks in accordance with the shape or complicity of the image; a first switch for changing the data transfer path based on whether the image data provided from said block segmentator is the one that corresponds to the substantially complicated image; a first and second compressors for compressing the image data through said first switch respectively by adopting different compression methods, and for providing the compressed data with said transmitter; an extra information generator for producing an information data that represents whether said divided image data in sub-blocks was compressed by said first compressor or said second compressor; a second switch for changing the data transfer path for said compressed image data based on the information of said extra data received by said receiver; a first and second decompressors for restoring said compressed image data through said second switch by adopting different decompression methods respectively corresponding to said different compression method; a block mixer for composing the predetermined sub-block pixels successively provided from the first decompressor or second decompressors to be restored to its original image of the predetermined block unit; and a second block memory for storing said restored original image data of predetermined blocks provided by said block mixer and for writing said restored original image data into the video memory.

Further, the block segmentator determines the degree of image complexity by summation of the data values of the pixels corresponding to said predetermined number of sub-blocks, and adapts a quad-tree image data structure for storing the information related to the further division of said blocks in accordance with said degree of image complicity.

Preferably, the information data produced in the extra information generator is consist of an bit stream for representing each segmental block data divided by the block segmentator.

Other aims and advantages, as well as a more complete understanding of the present invention, will appear from the following explanation of exemplary embodiment and the accompanying drawings thereof.

DETAILED DESCRIPTION OF THE PREFERRED EMBODIMENT

Figure 2:
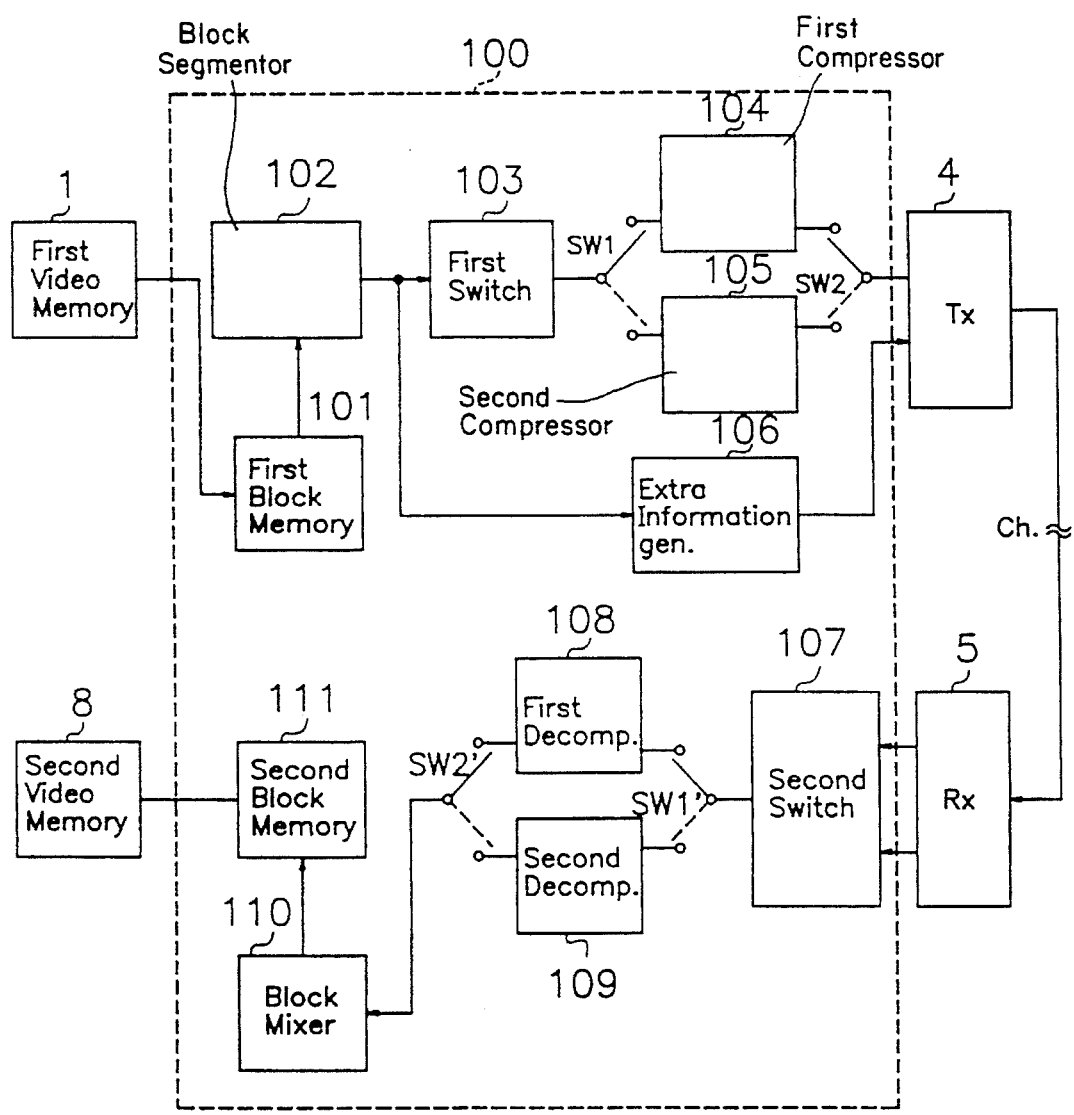
FIG. 2 is a block diagram for depicting an arrangement for compressing and decompressing image data in accordance with the preferred embodiment of the present invention.

Referring to FIG. 2, a preferred embodiment of the present invention is shown as a block diagram. In particular, the arrangement depicted within the dashed line 100 constitutes the feature of this invention. This arrangement enables an image frame from the video memory to be separated into a plurality of prescribed segments and then to be compressed according to the image data configuration at each segment by using block segmentation and compression method. Also, it is possible to restore the original image data from thus compressed data received by associated transmission line within this arrangement.

Figure 1:
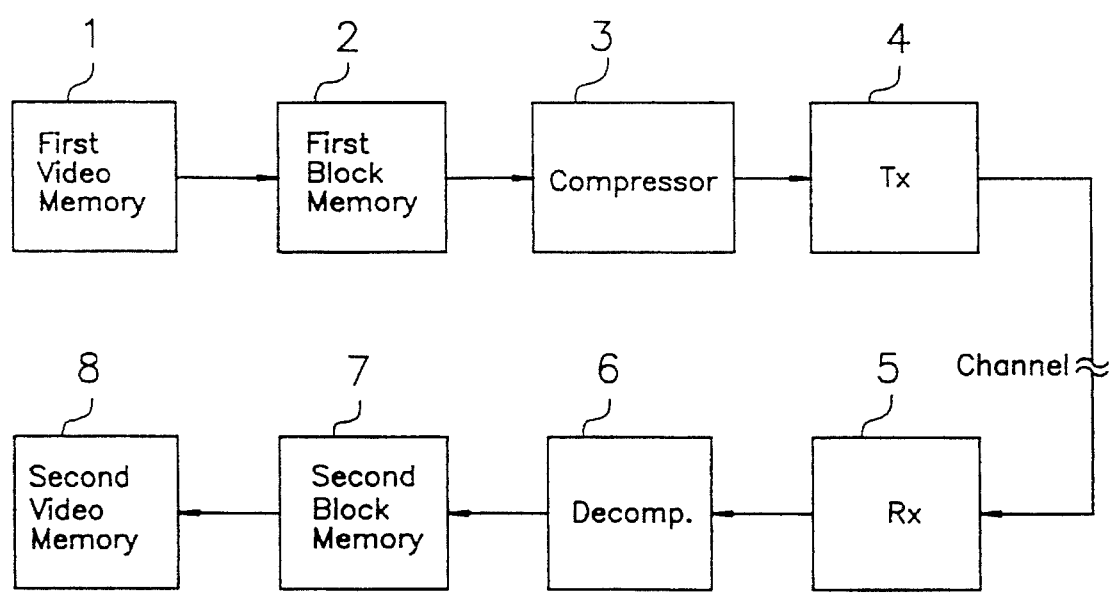
FIG. 1 is a block diagram for illustrating a construction of prior art data compressing and decompressing arrangement.

The above arrangement includes a first block memory 101 and a second block memory 111, as similar in FIG. 1, which are incorporated with a first video memory 1 and a second video memory 8, respectively. Each block memories 101, 111 store an image frame data in blocks of 32×32.

Associated with the first block memory 101 is a block segmentator 102 which determines whether the image data is belong to the "complicated area" that has severe change of data value relative to the shape of image or it corresponds to the "flat area" which has relatively low variation of image data, and divides the image frame data into prescribed number of sub-blocks in accordance with the shape or complicity of the image. In this embodiment, the block segmentator 102 divides 32×32 blocks of the frame data again into 16×16 or 8×8 sub-blocks, and thus forms a quad-tree structure.

Following the block segmentator 102, a first switch 103 is provided to change the data transfer path based on whether the image data provided from the block segmentator 102 is the one that corresponds to the complicated image. The data transfer path includes both switches SW1 and SW2 provided at front and rear end of the compressor according to the invention.

The compressor of the invention includes two compressors, 104 and 105, configured such that a first compressor 104 deals with the image data that is relative to the "complicated area," and a second compressor 105 to the "flat area".

Also, there is provided an extra information generator 106 which produces an information data that represents whether the divided image data in sub-blocks from the block segmentator 102 is compressed by the first compressor 104 or the second compressor 105. The produced extra information data is fed to the transmitter 4.

The data transfer path is led to the transmitter 4 as similar in the prior art form. Thus, the transmitter 4 is provided with the compressed image block data through the first compressor 104 or the second compressor 105 as well as an extra information relative to whether the divided image data in sub-blocks from the block segmentator 102 is compressed by the first compressor 104 or the second compressor 105. Also, the transmitter 4 transfers such compressed data together with the extra information to the receiver 5 via a transmission line or channel.

The receiver 5 is associated with a second switch 107 of this invention and provides the compressed data and the extra information received via the transmission line or channel. The second switch 107 switches the data transfer path for the compressed image data based on the information of the received extra data.

The data transfer path comprises a first decompressor 108 and a second decompressor 109 for restoring the compressed image data received from the transmitter 4.

The second switch 107 is configured such that it switches the data transfer path to the first decompressor 108 if the switch 107 recognizes that the received data was compressed at the above first compressor 104, and to the second decompressor 109 if the data was compressed at the second compressor 105.

The data transfer path is finally led to a block mixer 110 which composes 16×16 or 8×8 sub-block pixel which is restored to its original shape through the first decompressor 108 or the second decompressor 109, and the block mixer 110 provides the restored resultant image data in blocks of 32×32 with a second block memory 111 successively.

In the above-described embodiment, an affinity judgment method is used for block segmentation process. Also, the above mentioned quad-tree structure is used in order to transfer the block-segmented data. In addition, the first compressor 104 is able to compress the block segmented data by using well known DCT and quantization method, and the second compressor 105 is using pixel duplication by representative value method. The first and second decompressors 108,109 and the block mixer 110 is configured such that the processes as those of in the above mentioned first and second compressors 104,105 are performed.

The principle of operation and the effect of the present invention will be apparent from the following description.

Figure 4:
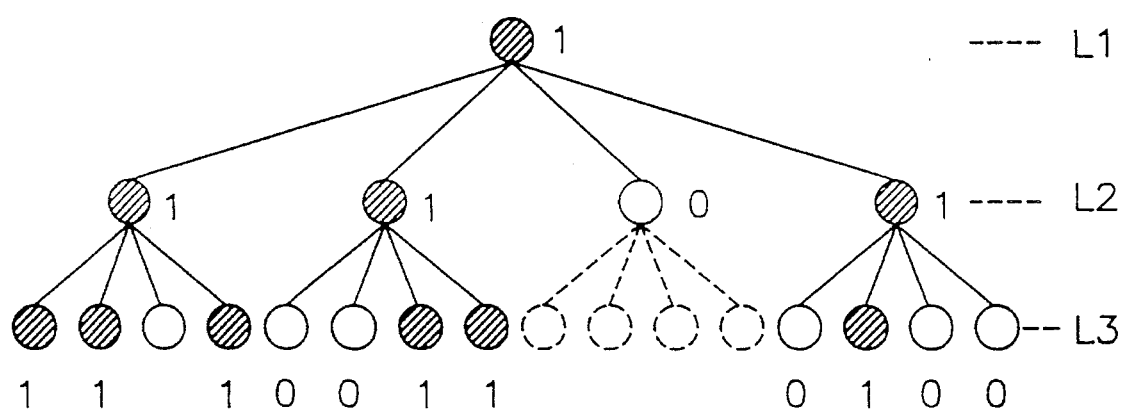
FIG. 4 is a tree diagram of the image data configuration which is corresponding to the image data of FIG. 3.

The one frame image data stored in the first video memory 1 is read in the first memory 101 in blocks of 32×32 in order to be compressed. The block data loaded in the first block memory 101 is provided to the block segmentator 102 which determines the status of the image and divides the image frame into a plurality of 8×8 sub-blocks as a whole. For example, as shown in attached drawing FIG. 3, if the boundary segments of an image frame are found as indicated in hatched portion, the block segmentator 102 may adapts each 8×8 segments or sub-blocks numbered 1 to 16 to the following equations.

$$M = \sum_i \sum_j x(i,j) \quad (1)$$

$$M_k = \sum_p \sum_q x_k(p,q) \quad (2)$$

where M means the summation of pixel data in the most high level L1 (32×32 block data) among the respective node data which constitutes quad-tree shown in FIG. 4, and $M_k$ means the summation of pixel data for the level L2 (16×16 sub-block data) which corresponds to the son node of the most high level L1. Further, x(i, j) represents coordinates of the most high level block and $x_k(p, q)$ of the next low level sub-blocks. Also, in the above expression 2, k is equal to 0, 1, 2, and 3.

Thus, in the first level L1, the value of M is equal to the pixel data value of the whole 32×32 block, and the value of $M_k$ is equal to the summation of the pixel data value corresponding to four 16×16 sub-blocks within the 32×32 block.

Figure 3:
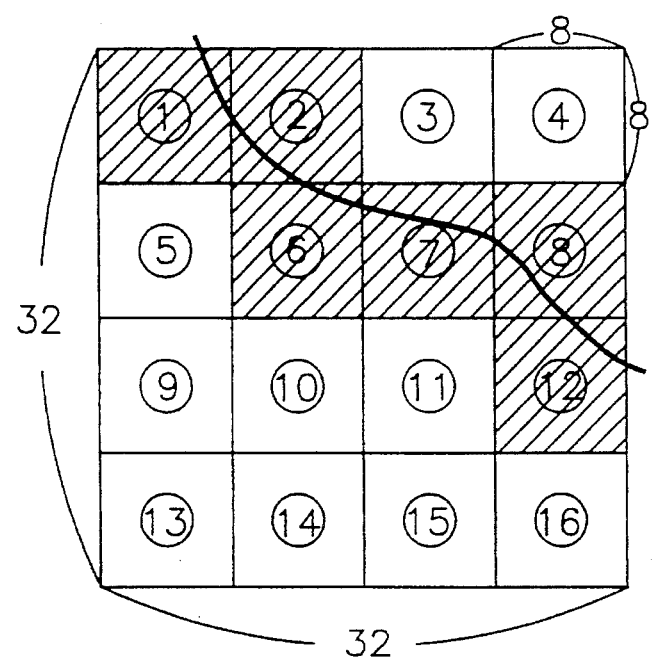
FIG. 3 is an example represents an image segmented into sixteen sub-blocks or segments which constitute 32×32 block of an image frame.

When k equals 0, $M_0$ is the summation of the data value of 4(four) sub-blocks denoted as segments 1,2,5, and 6 in FIG. 3. Similarly, $M_1$ is the summation of data value for the segments 3,4,7, and 8, $M_2$ is for 9,10,13, and 14, and $M_3$ is for 11,12,15, and 16.

Further, in the case of the second level L2, the value of M is equal to the summation of the pixel data value of the 16×16 blocks, and the value of $M_k$ is equal to the summation of the pixel data value corresponding to four 8×8 sub-blocks within the 16×16 block.

If the obtained value satisfies the following expression 3, the block segmentator determines the image status is in the "flat area" and combines four sub-blocks. Otherwise, the block segmentator determines the image status is in the "complicated area."

$$(|M/4-M_0|<\sigma)\cap(|M/4-M_1|<\sigma)\cap(|M/4-M_2|<\sigma)\cap(|M/4-M_3|<\sigma) \quad (3)$$

That is, once the difference between the summation of each pixel data of four sub-blocks and the value divided by 4 of summation of total 32×32 block data is obtained, and if the absolute value of the difference is less than the predetermined threshold value $\sigma$, the block segmentator determines the image status the "flat area."

By adopting the above described methods to the image configuration depicted in FIG. 3, it is determined that the hatched segments 1,2,6,7,8, and 12 of the 8×8 sub-blocks are to be found "complicated area," and the rest sub-blocks are "flat area". In this case, among the rest sub-blocks which correspond to the "flat area," the denoted segments 9,10,13, and 14 are combined as one 16×16 block.

The image data configuration corresponding to the image data of FIG. 3 is shown in FIG. 4 as a tree diagram. In the tree structure, the nodes denoted by hatched circle indicate that it should be divided into the lower level node, and the empty circle nodes indicate that it is not necessary to be divided.

Consequently, each segmental block data can be represent by the following bit streams.

| 1 | 1101 | 1101 0011 0100 |
|---|------|----------------|
| L1 | L2 | L3 | where "1" represents the "complicated area" and "0" the "flat area".

As described above, when the features of each blocks have determined by the block segmentator 102 of FIG. 2, the data which corresponds to the "complicated area" is compressed by the first compressor 104 that performs well known DCT and quantization method, and the data which corresponds to the "flat area" is compressed by the second compressor 105.

Figure 5:
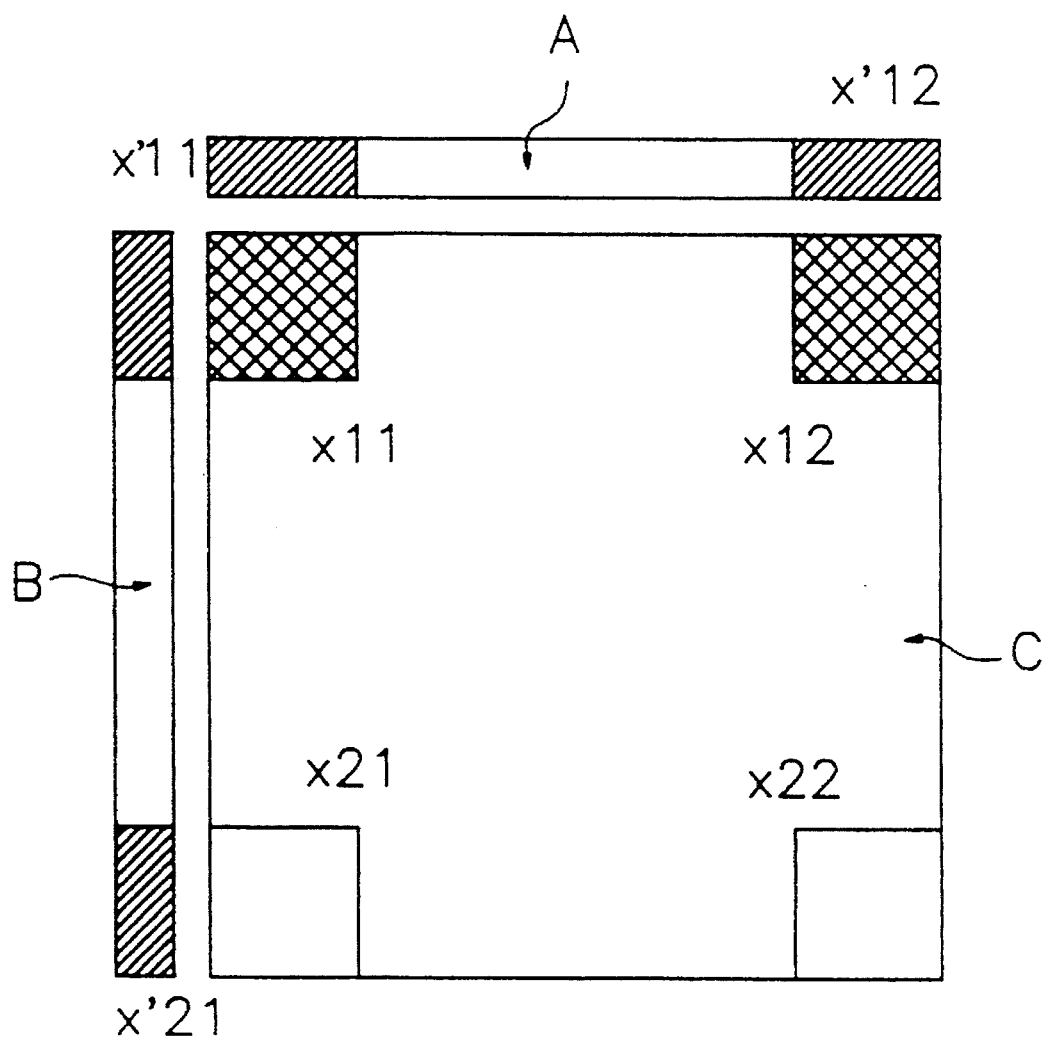
FIG. 5 is a representation for explaining the compression method related to relatively low variation of image data of 8×8 sub-block.
Figure 6A:
FIG. 6 (a) and (b) represent an original image and the corresponding segmented image that reflects segmental complicity of the original image, respectively.
Figure 6B:

Referring to FIG. 5, there is shown a pixel configuration necessary for compressing the 8×8 sub-block image data as denoted by area "C" which has relatively low variation of image and corresponds to the "flat area," and the scheme of compression in the second compressor 105 will be described therewith.

In the drawing, area "A" and "B" denote the previously compressed pixel blocks located at upper and left portion of the sub-block "C" now to be compressed. The second compressor 105 may select appropriate data value(s) among the pixel data $x'_{11}$, $x'_{12}$, and $x'_{21}$ in the previously compressed pixel blocks A and B corresponding to the upper edge and left edge of the sub-block area C and the pixel data $x_{11}$, $x_{12}$, $x_{21}$, and $x_{22}$ located at four edge of the sub-block C to be compressed. The selected representative data values are transferred to the transmitter 4, and via channel to the receiving end.

The condition of selecting the data values in the previously compressed pixel blocks A and B in order to compress the flat area pixel data is as follows;

1) Otherwise the boundary of image exists around the block C. The second compressor may select the pixel data $x_{11}$, $x_{12}$, $x_{21}$, $x_{22}$.
2) Otherwise satisfies the expression; $(|x'_{11}-x_{11}|<T)\cap(|x'_{12}-x_{12}|<T)\cap(|x'_{21}-x_{21}|<T)$. In second compressor may select one pixel data $x_{22}$.

where T denotes a predetermined threshold value. Preferably, the above pixel data $x_{11}$, $x_{12}$, $x_{21}$, and $x_{22}$ takes the respective mean values of their sub-blocks pixel data of 4×4 block, in order to reduce the impulse noise contained in picture signal.

When the compression of the 32×32 block data has completed through the above procedure, the transmitter 4 mixes the bit streams of the compressed data and that of the quad-tree structure, and transfers them to the receiving end.

Once the compressed data and the extra information via the transmission line or channel is received by the receiver 5, the second switch 107 switches the data transfer path for the compressed data such that the restoration of the image is made by means of the corresponding decompression method by analyzing the bit streams related to the quad-tree structure.

Thus, if the compressed data was compressed at the above first compressor 104, the restoration is occurred at the first decompressor 108, and if the data was compressed at the second compressor 105, at the second decompressor 109.

The decompressed data is finally transferred to a block mixer 110. There, the sub-block data of 16×16 or 8×8 restored to its original shape through the first decompressor 108 or the second decompressor 109 is composed to provide the original image data in blocks of 32×32 with a second block memory 111 successively.

As apparent from the foregoing, the present invention is able to improve the data processing efficiency in the field of image compression and decompression by reducing the operation of redundant image data, for it adopts the different compressing methods in accordance with the configuration of the image, and thereby to prevent distortion over the boundary area of the image during the compression and to minimize the quantity of the compressed data. Further, in the case of simple color image, the compression efficiency is notably enhanced.

What is claimed is:

1. An image data processing system which includes a video memory for storing the one frame image data and an apparatus for compressing and decompressing the image data for sending and receiving the compressed data through a transmitter and a receiver via a channel, the means for compressing and decompressing the image data comprising:

a first block memory for storing the image data from said video memory per predetermined block unit;

a block segmentator for dividing said image data provided by said first block memory into prescribed number of sub-blocks in accordance with the shape or complicity of the image;

a first switch for changing the data transfer path based on whether the image data provided from said block segmentator is the one that corresponds to the substantially complicated image;

a first and second compressors for compressing the image data through said first switch respectively by adopting different compression methods, and for providing the compressed data with said transmitter;

an extra information generator for producing an information data that represents whether said divided image data in sub-blocks from said block segmentator was compressed by said first compressor or said second compressor, and for providing the extra information data with said transmitter;

a second switch for changing the data transfer path for said compressed image data based on the information of said extra data which are received by said receiver from said transmitter;

a first and second decompressors for restoring said compressed image data through said second switch by adopting different decompression methods respectively which are corresponding to said different compression method;

a block mixer for composing the predetermined sub-blocks pixels successively provided from said first decompressor or second decompressor to be restored to its original image of said predetermined block unit; and a second block memory for storing said restored original image data of predetermined blocks provided by said block mixer and for writing said restored original image data into said video memory.

2. The apparatus for compressing and decompressing the image data according to claim 1, wherein said block segmentator determines the degree of image complicity by summation of the data values of the pixels corresponding to said predetermined number of sub-blocks, and adapts a quad-tree image data structure for storing the information related to the further division of said blocks in accordance with said degree of image complicity.

3. The apparatus for compressing and decompressing the image data according to claim 1, wherein said information data produced at said extra information generator is consist of an bit stream for representing each segmental block data divided by said block segmentator.

4. The apparatus for compressing and decompressing the image data according to claim 1, wherein said relatively low variation or less complicated image data is compressed by said second compressor by referring to the value of previously compressed pixel data ($x'_{11}$, $x'_{12}$, and $x'_{21}$) located at the upper edge and left edge of said sub-block area and value of the pixel data ($x_{11}$, $x_{12}$, $x_{21}$, and $x_{22}$) corresponding to four edge of said sub-block to be compressed, and selecting the representative data values to be transferred to the transmitter such that if the boundary of image exists around said sub-block, said pixel data $x_{11}$, $x_{12}$, $x_{21}$, and $x_{22}$ are selected and if it satisfies the expression; $(|x'_{11}-x_{11}|<T) \cap (|x'_{12}-x_{12}|<T) \cap (|x'_{21}-x_{21}|<T)$, said one pixel data $x_{22}$ is selected where T denotes a predetermined threshold value.

5. The apparatus for compressing and decompressing the image data according to claim 4, wherein said pixel data $x_{11}$, $x_{12}$, $x_{21}$, and $x_{22}$ takes the respective mean values of their extended sub-blocks pixel data for reducing the impulse noise contained in picture signal.

* * * * *